(12) United States Patent
Horiuchi

(10) Patent No.: US 8,693,023 B2
(45) Date of Patent: Apr. 8, 2014

(54) RECORDING CONTROL DEVICE, RECORDING SYSTEM, RECORDING CONTROL METHOD, AND RECORDING MEDIUM STORING A PROGRAM EXECUTED BY A CONTROL UNIT THAT CONTROLS THE RECORDING DEVICE

(75) Inventor: Yukiharu Horiuchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 13/109,035

(22) Filed: May 17, 2011

(65) Prior Publication Data

US 2011/0279850 A1 Nov. 17, 2011

(30) Foreign Application Priority Data

May 17, 2010 (JP) ................................. 2010-112893

(51) Int. Cl.
*G06K 15/00* (2006.01)
*G06F 3/12* (2006.01)

(52) U.S. Cl.
USPC .......................... 358/1.14; 358/1.15; 709/201

(58) Field of Classification Search
None
See application file for complete search history.

(56) References Cited

U.S. PATENT DOCUMENTS

| 7,774,401 B2* | 8/2010 | Miwa et al. ................... 709/201 |
| 8,339,629 B2* | 12/2012 | Maki ............................ 358/1.14 |
| 2005/0105127 A1* | 5/2005 | Miwa et al. .................. 358/1.15 |
| 2005/0185213 A1 | 8/2005 | Miki |
| 2006/0256372 A1* | 11/2006 | Suzuki ......................... 358/1.15 |
| 2006/0271829 A1* | 11/2006 | Matsumae ....................... 714/48 |
| 2007/0013936 A1* | 1/2007 | Ishimoto ...................... 358/1.13 |
| 2009/0002769 A1* | 1/2009 | Keisaku ......................... 358/401 |
| 2009/0161144 A1* | 6/2009 | Huang .......................... 358/1.15 |
| 2009/0190166 A1* | 7/2009 | Nakamura et al. ........... 358/1.15 |
| 2009/0268228 A1* | 10/2009 | Lankreijer et al. ........... 358/1.14 |

FOREIGN PATENT DOCUMENTS

| JP | 11-134146 A | 5/1999 |
| JP | 2005-231229 | 9/2005 |
| JP | 2009-151786 | 7/2009 |

* cited by examiner

*Primary Examiner* — Satwant Singh
(74) *Attorney, Agent, or Firm* — Nutter McClennen & Fish LLP; John J. Penny, Jr.; Michael P. Visconti, III

(57) ABSTRACT

A printer that detects an error when a host computer does not send a timer reset command for a specific time is connected to a host computer. The host computer outputs a timer reset command to the printer using an application execution unit function, and causes the printer to print data processed by the application program. A timer reset command is sent to the printer when the application execution unit outputs a timer reset command and when a print job for printing the data is sent to the printer.

7 Claims, 4 Drawing Sheets

RECORDING CONTROL DEVICE, RECORDING SYSTEM, RECORDING CONTROL METHOD, AND RECORDING MEDIUM STORING A PROGRAM EXECUTED BY A CONTROL UNIT THAT CONTROLS THE RECORDING DEVICE

Priority is claimed under 35 U.S.C. §119 to Japanese Application No. 2010-112893 filed on May 17, 2010, which is hereby incorporated by reference in its entirety.

BACKGROUND

1. Technical Field

The present invention relates to a recording control device connected to a recording device, to a recording system that has this recording control device, to a recording control method executed by the recording control device, and to a program.

2. Related Art

Technology enabling a recording device to detect errors in data sent from an external device when a printer or other recording device is connected to a host device or other external device is taught in Japanese Unexamined Patent Appl. Pub. JP-A-H11-134146. Using the technology taught in JP-A-H11-134146, the recording device automatically determines if recording data is missing, for example, and detects errors during data transmission.

The system taught in JP-A-H11-134146 detects errors during data transmission from an external device to the recording device. Other events that could interfere with normal printing include a loss of power due to a mistake operating the external device connected to the recording device, external device hang-up, or a short in or disconnection of the cable connecting the external device and the recording device. When such an event occurs, the recording device cannot receive data and an OK/error determination based on the received data is difficult. As a result, the user must directly check the operating status of the external device. However, if the external device and recording device are in separate locations, the need for the user of the recording device to go and check the status of the external device is a bother and imposition for the user.

SUMMARY

When a recording device and external device are communicably connected, the present invention enables the recording device to accurately detect errors in the operating status of the external device connected to the recording device.

A first aspect of at least one embodiment of the invention is a recording control device that is communicably connected to a recording device that receives a connection confirmation command and detects (determines) an error when a time during which the connection confirmation command is not received reaches a first reference time, the recording control device including: an application execution unit that executes an application program and outputs data processed by the application program as recording data; and a recording control unit that sends a recording job to the recording device based on the recording data output by the application execution unit. When the application execution unit does not output the connection confirmation command, the recording control unit checks the status of the application execution unit and based on the status generates and sends the connection confirmation command to the recording device instead of the application execution unit.

In this aspect of the invention a recording control device connected to a recording device that performs a function of detecting an error when a connection confirmation command is not received from the externally connected recording control device sends a connection confirmation command to the recording device when the application execution unit running an application program outputs a connection confirmation command to the recording device and when recording data for recording data processed by the application execution unit is sent to the recording device. However, when the application execution unit cannot output the connection confirmation command due to an unexpected event such as the output timing of the recording data and the transmission timing of the connection confirmation command overlapping, the recording control unit checks the status of the application execution unit, and instead of the application execution unit generates and sends the connection confirmation command to the recording device based on this status. As a result, the recording device will not detect an error when the recording control unit is operating normally and can execute the application program, and the recording device can accurately detect errors in the operating status of the recording control device.

Preferably, recording control unit has a timer, outputs a response request to the application execution unit before the time during which the application execution unit does not output at least the connection confirmation command reaches the first reference time, and sends the connection confirmation command to the recording device if the application execution unit outputs a response to the response request, With this aspect of the invention the recording device can be prevented from detecting an error when the application execution unit does not send a connection confirmation command due to an unexpected event because the recording device sends a response request to the application execution unit before detecting an error as a result of not receiving a connection confirmation command from the recording control device. The recording device can therefore accurately detect errors in the operating state of the recording control device because the recording device detects errors only when an error that should be detected occurs on the recording control device, such as when the application program cannot run or operation of the recording control device stops.

Further preferably, a second reference time that is shorter than the first reference time is preset in the recording control unit, and the recording control unit outputs a response request to the application execution unit when the time during which the application execution unit does not output at least the connection confirmation command reaches the second reference time.

Because a response request is sent to the application execution unit based on the second reference time, which is shorter than the first reference time at which the recording device detects an error, in this aspect of the invention, the response request can be reliably executed before the recording device detects an error, and the recording device can therefore be prevented from detecting an error when a connection confirmation command is not sent for some unexpected reason.

Further preferably, the recording control unit generates and sends the connection confirmation command to the recording device when the application execution unit outputs the recording data.

In this aspect of the invention the recording control unit instead of the application execution unit can generate and send the connection confirmation command to the recording device when the application execution unit does not output the connection confirmation command because the application execution unit can be determined to be operating normally when it is outputting recording data.

Another aspect of at least one embodiment of the invention is a recording system including a recording device that records on a recording medium, and a recording control device communicably connected to the recording device. The recording device includes a reception unit that receives a connection confirmation command from the recording control device, and an error detection unit that detects an error when the time during which the connection confirmation command is not received by the reception unit reaches a preset first reference time. The recording control device includes an application execution unit that executes an application program and outputs data processed by the application program as a recording data, and a recording control unit that sends a recording job to the recording device based on the recording data output by the application execution unit. When the application execution unit does not output the connection confirmation command, the recording control unit checks the status of the application execution unit and based on the status generates and sends the connection confirmation command to the recording device.

In this aspect of the invention a recording control device connected to a recording device that has a function for detecting an error when a connection confirmation command is not received from the recording control device sends a connection confirmation command to the recording device when the application execution unit running an application program outputs a connection confirmation command to the recording device and when recording data for recording data processed by the application execution unit is sent to the recording device. However, when the application execution unit cannot output the connection confirmation command due to an unexpected event such as the output timing of the recording data and the transmission timing of the connection confirmation command overlapping, the recording control unit checks the status of the application execution unit, and instead of the application execution unit generates and sends the connection confirmation command to the recording device based on this status. As a result, the recording device will not detect an error when the recording control unit is operating normally and can execute the application program, and the recording device can accurately detect errors in the operating status of the recording control device.

Another aspect of at least one embodiment of the invention is a recording control method that is executed by a recording control device that is communicably connected to a recording device that receives a connection confirmation command and detects an error when a time during which the connection confirmation command is not received reaches a first reference time, the recording control method including a step of: checking the operating status of an application program when the connection confirmation command is not output to the recording device when the application program executes, and based on the status generating and sending the connection confirmation command to the recording device.

In this aspect of the invention a recording control device connected to a recording device that performs a function of detecting an error when a connection confirmation command is not received from the recording control device checks the status of the application execution unit and generates and sends the connection confirmation command to the recording device based on this status when the application execution unit cannot output the connection confirmation command due to an unexpected event such as the output timing of the recording data and the transmission timing of the connection confirmation command overlapping. As a result, the recording device will not detect an error when the recording control device can execute the application program, and the recording device can accurately detect errors in the operating status of the recording control device.

Another aspect of at least one embodiment of the invention is a program executed by a recording control unit that is communicably connected to a recording device that receives a connection confirmation command and detects an error when a time during which the connection confirmation command is not received reaches a first reference time, the program including a step of checking the operating status of an application program when the connection confirmation command is not output to the recording device when the application program executes, and based on the status generating and sending the connection confirmation command to the recording device.

In this aspect of the invention a recording control device connected to a recording device that performs a function of detecting an error when a connection confirmation command is not received from the recording control device checks the status of the application execution unit and generates and sends the connection confirmation command to the recording device based on this status when the application execution unit cannot output the connection confirmation command due to an unexpected event such as the output timing of the recording data and the transmission timing of the connection confirmation command overlapping. As a result, the recording device will not detect an error when the recording control device can execute the application program, and the recording device can accurately detect errors in the operating status of the recording control device.

Effect of the Invention

A recording device according to at least one embodiment of the invention will not detect an error when the recording control device can execute the application program, and the recording device can accurately detect errors in the operating status of the recording control device.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
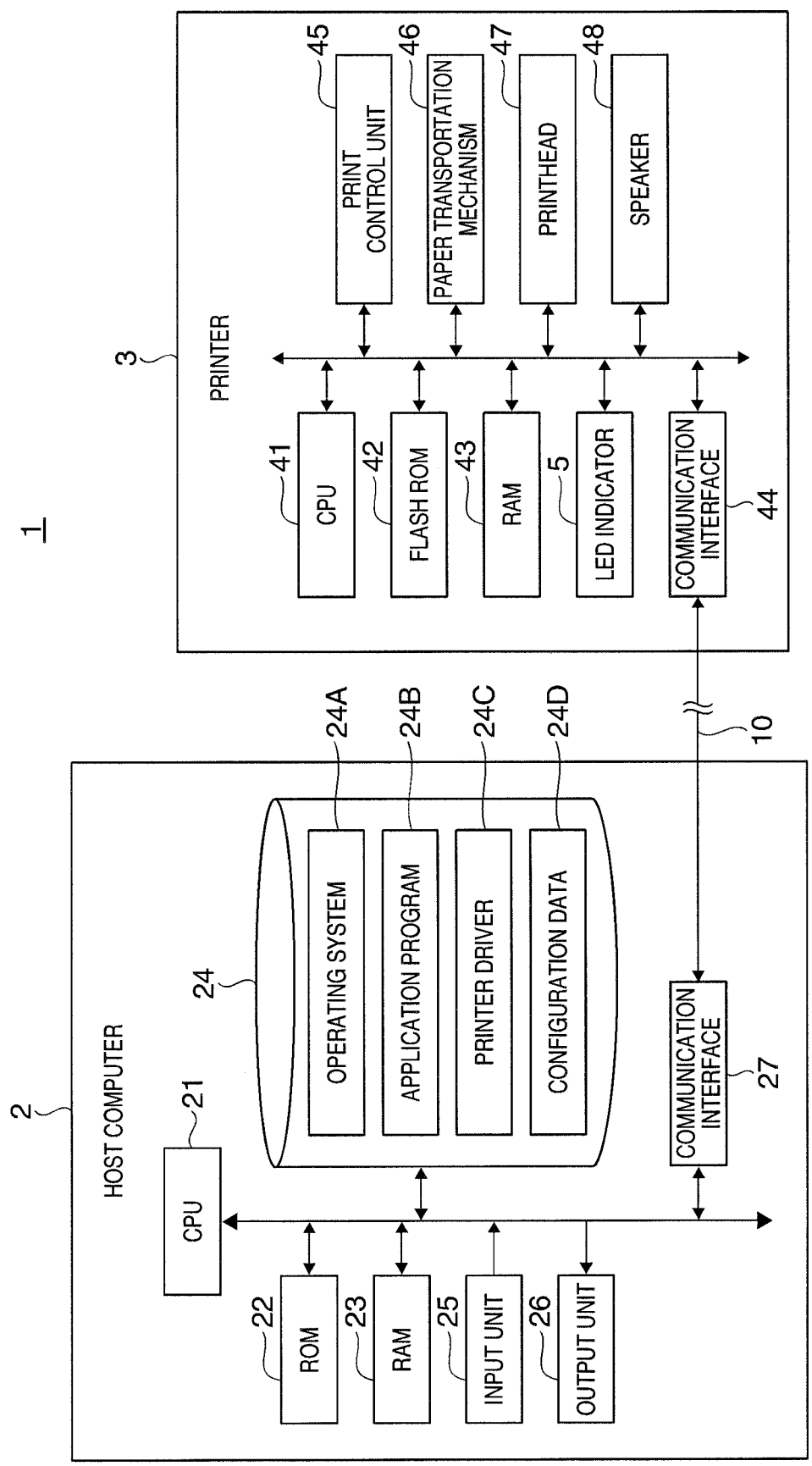
FIG. 1 is a block diagram showing the electrical configuration of a recording system according to a preferred embodiment of the invention.

FIG. 1 is a block diagram showing the electrical configuration of a recording system 1 according to a preferred embodiment of the invention.

The recording system 1 includes a printer 3 and a host computer 2 communicably connected to each other over a communication line 10. The printer 3 is an example of a recording device that prints (records) markings such as text or images on a cut-sheet recording medium or continuous web of plain paper, coated paper, or plastic, for example. The host computer 2 is a recording control device that controls and causes the printer 3 to record the markings. This embodiment of the invention shows a configuration having a 1:1 connection between the host computer 2 and printer 3, but there is no limit to the number of printers 3 that may be connected to one host computer 2, and a plurality of printers 3 may be connected to the host computer 2. A configuration having one printer 3 connected to a plurality of host computers 2 is also conceivable.

The communication line 10 is a communication cable or wireless connection connecting the host computer 2 and printer 3 1:1. Alternatively, the communication line 10 may be a wired or wireless LAN, or a wide-area network using public telecommunication lines, for connecting a plurality of printers 3 to one host computer 2.

Furthermore, while the recording method of the printer 3 is also not particularly limited, the printer 3 according to this embodiment of the invention is an inkjet printer that prints markings such as text or images by discharging plural colors of ink from a printhead onto the recording medium.

As shown in FIG. 1, main components of the host computer 2 include a CPU 21, a ROM 22 as nonvolatile memory, RAM 23 as volatile memory, a storage unit 24 as a large capacity storage device, an input unit 25 connected to a keyboard or other input device, an output unit 26 connected to a display device or other output device, and a communication interface 27. The host computer 2 controls the printer 3 using the CPU 21 executing the operating system 24A, application program 24B, and printer driver 24C stored in the storage unit 24 and outputting commands and print data to the printer 3 through the communication interface 27. The host computer 2 sends print jobs including the data to be printed and a command instructing the printer to print the print data to the printer 3. The host computer 2 also sends a timer reset command (connection confirmation command) described below at a regular period to the printer 3.

Main components of the printer 3 include a CPU 41, a ROM 42 as nonvolatile memory, RAM 43 as volatile memory, a communication interface 44, a print control unit 45 that prints by discharging ink onto paper used as the recording medium, a paper transportation mechanism 46, a printhead 47, a speaker 48, and an LED indicator 5.

The printer 3 receives print data by communicating with the host computer 2 through the communication interface 44 while the CPU 41 executes firmware stored in flash ROM 42. Based on the received commands and print data, the print control unit 45 drives the printhead 47 while conveying the paper using the paper transportation mechanism 46 to print on the paper and issue a receipt or coupon, for example. The printer 3 reports information visually or audibly to the user when issuing a receipt or coupon, for example, and when an error occurs, including host computer 2 errors, by causing the LED indicator 5 to light steady or blink, or outputting a melody or spoken message from the speaker 48. The speaker 48 may also be a simple buzzer.

The printer 3 monitors commands sent from the host computer 2, and determines if the host computer 2 is operating normally. The printer 3 also executes a specific error detection process when the host computer 2 is determined to not be operating normally. This error detection process of the printer 3 is described below.

Figure 2:
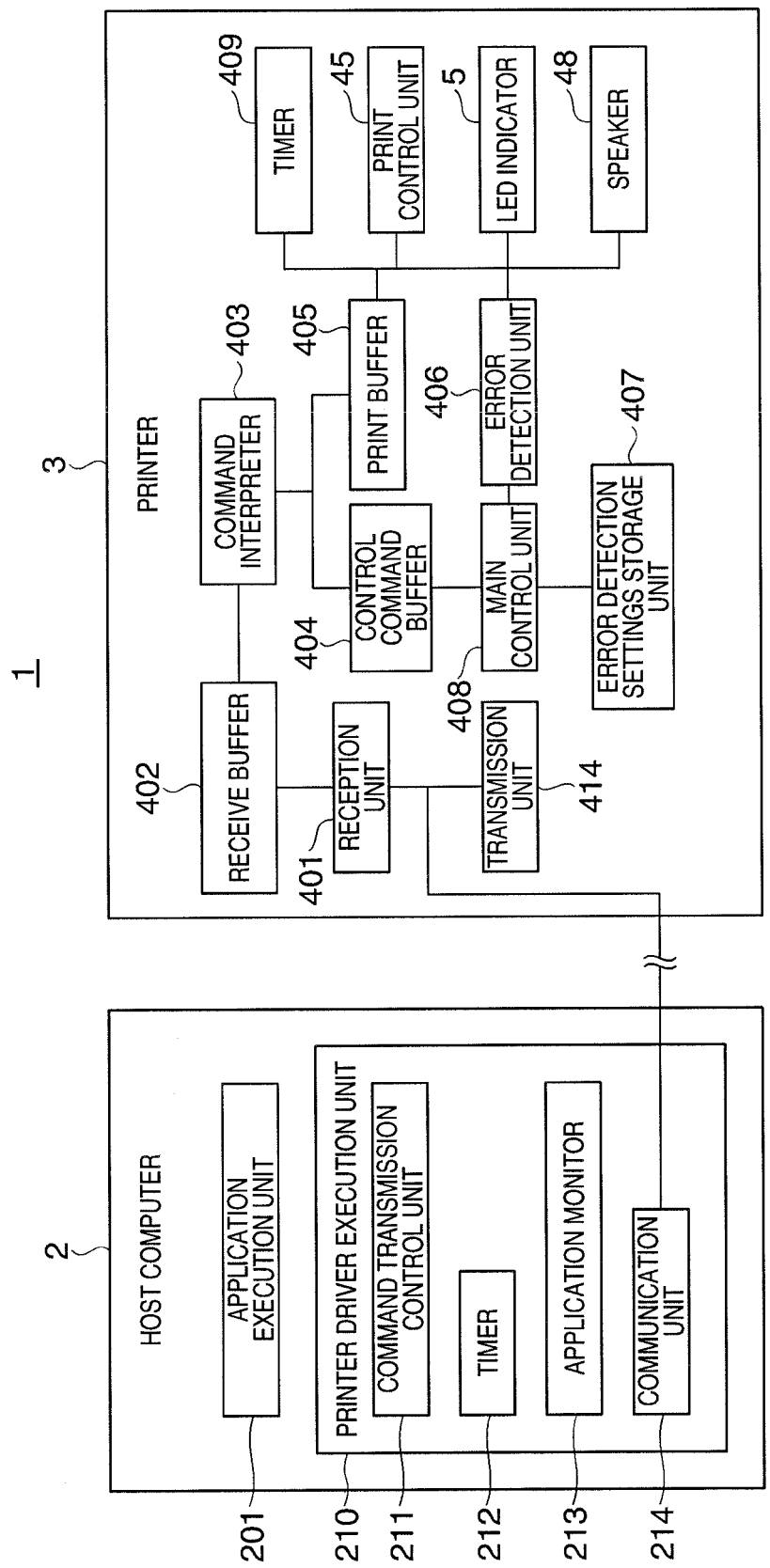
FIG. 2 is a function block diagram of the host computer and printer.

FIG. 2 is a function block diagram showing the functional configuration of the host computer 2 and printer 3 in the recording system 1. The units shown in FIG. 2 are performed by the cooperation of hardware and software resulting from the CPU 21 of the host computer 2 running programs stored in the storage unit 24, and the CPU 41 of the printer 3 running programs stored in flash ROM 42.

As shown in FIG. 2, the printer 3 includes a reception unit 401 that receives commands and print data sent from the host computer 2, and a receive buffer 402 that temporarily stores the commands and print data received by the reception unit 401. The data stored by the receive buffer 402 is interpreted by the command interpreter 403, which passes control commands to the control command buffer 404 and print data to the print buffer 405 by DMA, for example.

Print data temporarily stored in the print buffer 405 is converted by a data conversion process to produce dot pattern data corresponding to the nozzle rows of the printhead 47, and stored in the print buffer 405. The control command data temporarily stored in the control command buffer 404 is read by the main control unit 408, and processes corresponding to the control commands, such as cutting the paper used as the recording medium, are executed by the main control unit 408.

The error detection unit 406 monitors if the host computer 2 is operating normally, and if a host computer 2 operating error is detected, a host computer 2 error is reported to the user.

The error detection settings storage unit 407 is an area reserved in flash ROM 42, and stores settings used in the error detection process. These settings include a first reference time for determining if the host computer 2 is operating normally, and the type of reporting method used to report an error when a host computer 2 error is detected.

The error detection unit 406 starts the timer 409 counting, and monitors if the timer reset command (connection confirmation command) was received from the host computer 2 during the count. The timer reset command is a real-time control command (immediately executed control command), and is detected and received by the reception unit 401 even if the printer 3 is offline, for example. If a timer reset command is received by the reception unit 401, the error detection unit 406 stops the timer 409, resets the count, and then starts counting again. While normal control commands stored in the control command buffer 404 are executed sequentially, the printer 3 immediately executes real-time control commands with priority over other commands when the command interpreter 403 detects a real-time control command in the receive buffer 402.

The error detection unit 406 determines that a host computer 2 error has occurred if the timer 409 count reaches the first reference time stored in the error detection settings storage unit 407 before the reception unit 401 receives the timer reset command after the timer 409 starts counting. In other words, the host computer 2 sends the timer reset command to the printer 3 on a shorter cycle than the first reference time stored by the printer 3 in this recording system 1, and the printer 3 detects an error if this timer reset command is not received by the printer 3 within this first reference time.

The host computer 2 performs the basic functions of the printer 3 by running the operating system 24A stored in the storage unit 24. The host computer 2 includes an application execution unit 201 that runs an application program 24B stored in the storage unit 24, a printer driver execution unit 210 (recording control unit) that runs the printer driver 24C, and a communication unit 214 that communicates print jobs and commands with the printer 3.

The application execution unit 201 runs an application program, processes data, and constantly outputs the processed data. When printing is instructed while executing the application program, the application execution unit 201 outputs the print execution command and the data to be printed as the print data (data for recording) to the printer driver execution unit 210.

The application execution unit 201 generates and outputs a timer reset command each time a preset time passes to indicate normal operation. This timer reset command can be output as an independent command or output with the print data.

The printer driver execution unit 210 includes a command transmission control unit 211, timer 212, application monitor 213 that monitors the operating status of the application execution unit 201, and a communication unit 214 that communicates with the printer 3.

Based on the print communication (print data) output as a result of the application execution unit 201 running the application program, the command transmission control unit 211 generates control commands and print jobs for printing the print data, and outputs to the printer 3 using the communication unit 214. The print jobs include the data to be printed and a print execution command telling the printer to print the print data, and may include other commands in addition to the print execution command.

The communication unit 214 sends commands to the printer 3 and receives information from the printer 3 according to the application programming interface (API) through a port (a LAN port in this embodiment of the invention) for communicating with the printer 3.

When the application execution unit 201 outputs print data and an instruction to print, the command transmission control unit 211 generates a print job by generating and combining a print execution command with the data for printing, and sends the generated print job to the communication unit 214. When the application execution unit 201 outputs a timer reset command, the command transmission control unit 211 sends the timer reset command to the printer 3 through the communication unit 214. The command transmission control unit 211 also generates and sends a timer reset command through the communication unit 214 to the printer 3 when a print job is generated and sent to the printer 3. The command transmission control unit 211 thus sends a timer reset command to the printer 3 whenever the application execution unit 201 outputs a timer reset command or a print instruction.

The timer 212 counts while being controlled by the application monitor 213. The application monitor 213 starts counting using the timer 212 after the printer driver execution unit 210 starts operating, and monitors if the application execution unit 201 outputs a timer reset command or a print instruction including a timer reset command while counting continues. The data to be printed may be included in this print instruction, and if only the data to be printed is output, this print data may function as the print command. When a timer reset command is output from the application execution unit 201, the application monitor 213 stops counting by the timer 212, resets the count, and then restarts counting.

The application monitor 213 monitors whether or not the timer 212 count has reached a preset second reference time without the application execution unit 201 outputting a timer reset command or print data including a timer reset command after the timer 212 starts counting. This second reference time is stored as configuration data 24D in the storage unit 24. If the timer 212 count reaches this second reference time while the application execution unit 201 has not output the timer reset command or print data including a timer reset command, the application monitor 213 sends a response request to the application execution unit 201, and detects an application execution unit 201 error if there is no response to this response request. The application monitor 213 can determine from this response request that the application execution unit 201 is operating normally even when the application execution unit 201 is OK but cannot output a timer reset command.

When an error is detected, the application monitor 213 issues an error report using a function of the output unit 26 instead of sending a command to the printer 3.

As described above, the invention is not limited to using a dedicated timer reset command when stopping and resetting the timer 212 count, and may stop counting by the timer 212 and reset the count using a print or other control command or a command with a specific function other than printing. More specifically, the function of a timer reset command may be incorporated into a command that is used as a printing or other control command, or a command with a specific function other than printing. This configuration enables applying the invention using an existing command system without defining a new timer reset command.

If the application execution unit 201 hangs while executing the application program due to a software problem in the recording system 1, the host computer 2 may have stopped operating normally due to a problem with the communication line 10 connecting the host computer 2 and printer 3, or because the host computer 2 power supply was interrupted due to an operator error, for example. The printer 3 may also be located in a different location than the host computer 2 in this recording system 1. For example, the host computer 2 and printer 3 may be located on different floors in the same building, or the printer 3 and host computer 2 may be located in remote locations by using a dedicated circuit or public telecommunication network as the communication line 10. Because it is difficult for the user of the printer 3 to monitor the host computer 2 when the host computer 2 and printer 3 are remote from each other, the remote printer 3 can preferably quickly detect host computer 2 errors. So that host computer 2 errors can be quickly detected by a function of the printer 3, the recording system 1 detects errors based on the first reference time described above.

The error reporting method of the printer 3 may include one or a combination of printing an error message, displaying the error using an LED indicator 5, or outputting an audible error report such as a particular error sound or speech output from a speaker 48. By using a combination of a printed error message, audio output, and LED indicator 5 output, the printer 3 user can both visually and audibly recognize the host computer error status, reliably determine the cause even if the system is down, and can quickly take measures to recover the system.

Note that the first reference time and reporting settings stored in the printer 3 can be changed as a result of the host computer 2 outputting a configuration command even while the system is running. If the first reference time and reporting settings can thus be changed, an appropriate error detection process reflecting the preferred operating configuration of the system administrator can be executed.

The error detection process is described next with reference to FIG. 3.

Figure 3:
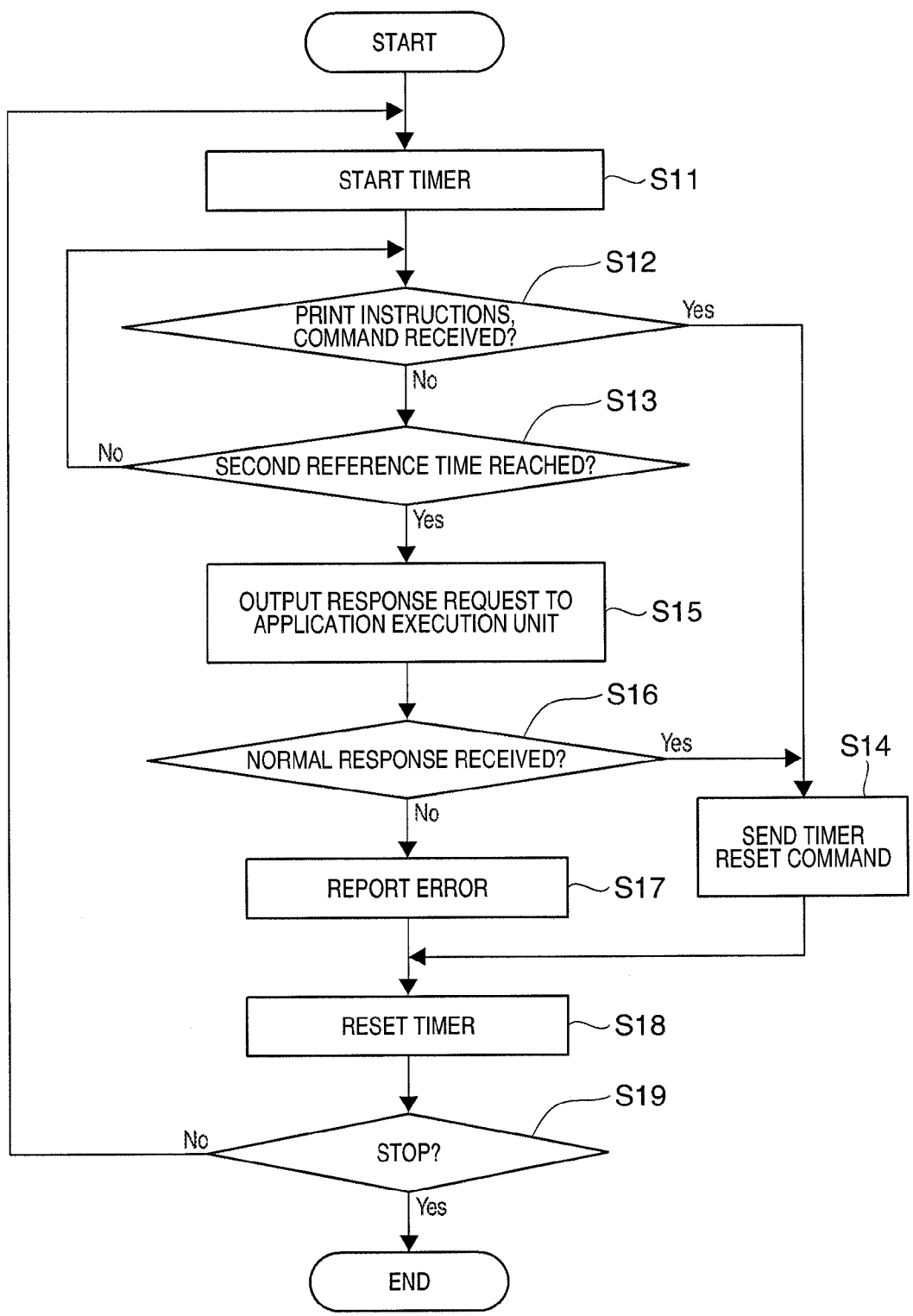
FIG. 3 is a flow chart of a process executed by the printer driver.

FIG. 3 is a flow chart showing the operation of the printer driver execution unit 210 in the host computer 2.

When it starts operating, the printer driver execution unit 210 starts the timer 212 counting (step S11), and determines by a function of the application monitor 213 whether the application execution unit 201 outputs a timer reset command or a print command (including the print data) including a timer reset command (step S12).

While a print command including a timer reset command or a timer reset command is not output, the printer driver execution unit 210 determines if the timer 212 count has reached the second reference time (step S13).

When the application execution unit 201 outputs a timer reset command or print instruction including a timer reset command (step S12 returns Yes), the printer driver execution unit 210 generates a timer reset command by a function of the command transmission control unit 211 and sends the command to the printer 3 through the communication unit 214 (step S14). After the timer reset command is sent, control goes to step S18 described below.

If the timer 212 count reaches the second reference time before the timer reset command or print instruction including a timer reset command is output (step S13 returns Yes), the printer driver execution unit 210 outputs a response request to the application execution unit 201 by a function of the application monitor 213 (step S15).

The application monitor 213 waits for the response from the application execution unit 201 to this response request (step S16), and if a normal response is received within a specific time (step S16 returns Yes), goes to step S14 and sends a timer reset command instead of the application execution unit 201.

If a normal response from the application execution unit 201 is not received within the specific time (step S16 returns No), the printer driver execution unit 210 determines that an error occurred in the operation of the application execution unit 201, reports the error using the output unit 26 (step S17), and goes to step S18. This configuration avoids determining that an error occurred when an error has not occurred in application execution unit 201 but the application execution unit 201 cannot output a timer reset command because it is executing a different process of higher priority.

In step S18 the printer driver execution unit 210 resets the timer 212 count, and determines whether or not to stop operation (step S19). If operation continues, the process returns to step S11. If operation stops, the process ends.

Figure 4:
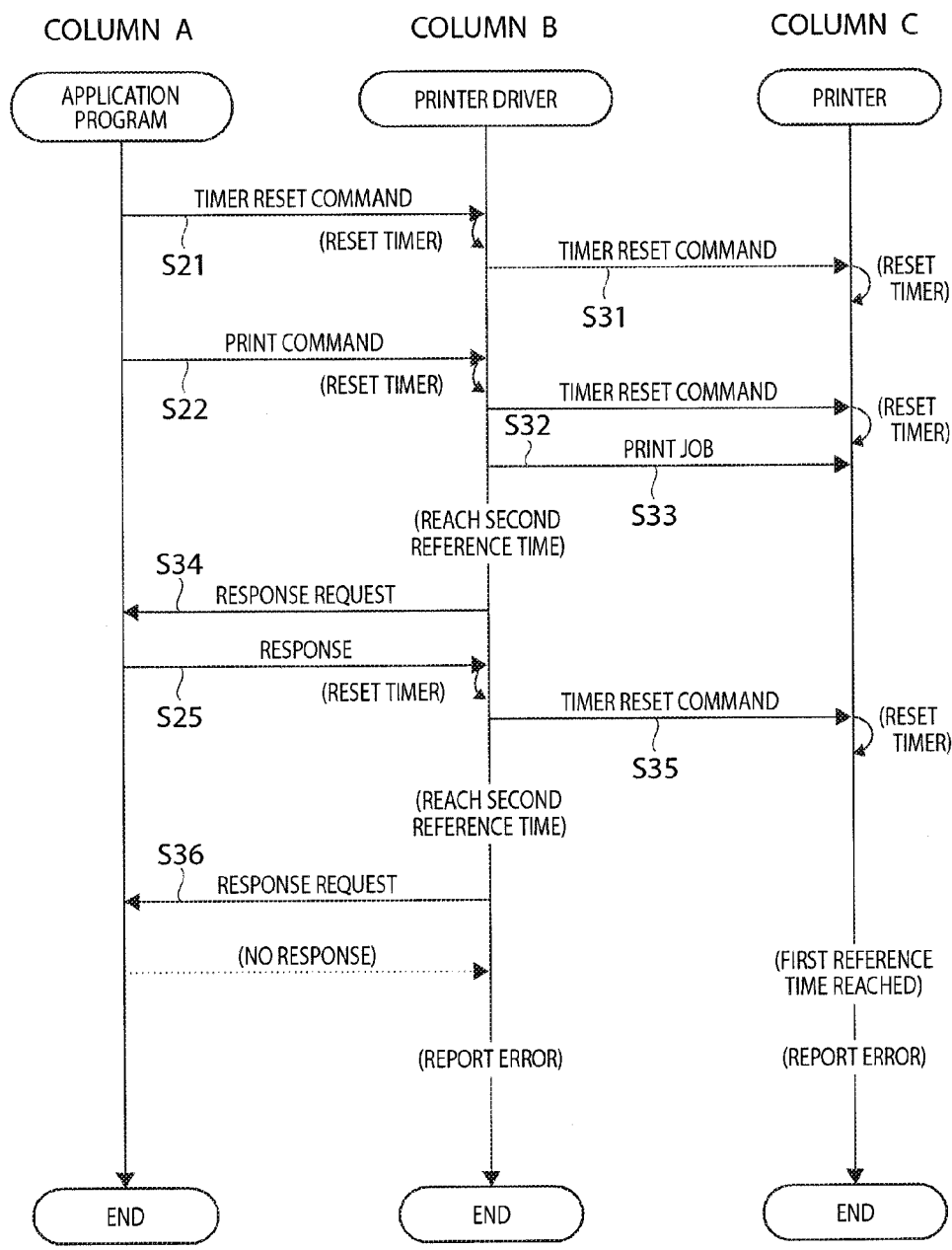
FIG. 4 shows an example of the operating sequence of the recording system.

FIG. 4 shows an example of the operating sequence of the recording system 1. In FIG. 4 the operation of the application execution unit 201 is shown in column A, the operation of the printer driver execution unit 210 is shown in column B, and the operation of the printer 3 is shown in column C.

As described above, the application program 24B is written to output a timer reset command at a regular period while it is being run by the application execution unit 201. The application execution unit 201 therefore outputs a timer reset command on a regular cycle (step S21), and the printer driver execution unit 210 thereby resets the timer 212 and sends a timer reset command to the printer 3 (step S31). The printer 3 receiving this timer reset command resets the timer 409.

In addition to when the application execution unit 201 outputs a timer reset command, the printer driver execution unit 210 also generates and sends a timer reset command to the printer 3 (step S32) when the application execution unit 201 outputs a print command (step S22). The printer driver execution unit 210 executes a process to generate and send a print job to the printer 3 according to the print instructions output by the application execution unit 201 (step S33).

This function of the printer driver execution unit 210 can send a timer reset command to the printer 3 when the timer reset command that should be output by the application execution unit 201 is not output, and when the output timing of the timer reset command is late. For example, if the timing when the application execution unit 201 outputs the timer reset command and the timing when the print instruction is output overlap, the output timing of the timer reset command may be delayed or the timer reset command may not be output because the print instruction takes priority. Even in such cases, however, a timer reset command can be reliably sent to the printer 3.

The printer driver execution unit 210 is configured so that the timer 212 count reaches the second reference time before the count of the printer 3 timer 409 reaches the first reference time used for error detection. When the timer 212 count reaches the second reference time, the printer driver execution unit 210 outputs a response request to the application execution unit 201 (steps S34, S36). When the application execution unit 201 outputs a response signal in response to this response request (step S25), the printer driver execution unit 210 generates and sends a timer reset command to the printer 3 (step S35). This is the operation whereby the printer driver execution unit 210 checks the operation of the application execution unit 201 immediately before the printer 3 detects an error when a timer reset command is not sent. A timer reset command may not be output even though the application execution unit 201 is operating normally because the application execution unit 201 is executing another process or another function unit is executing another process, or for some other unexpected reason. However, as a result of the printer driver execution unit 210 checking the operation of the application execution unit 201 and the printer driver execution unit 210 generating and outputting a substitute timer reset command immediately before the printer 3 detects an error, the printer 3 can be prevented from detecting an error while the application execution unit 201 is operating in such situations.

If the timer 212 count reaches the second reference time, the printer driver execution unit 210 outputs a response request to the application execution unit 201, and the application execution unit 201 does not return a response within the specified time, the printer driver execution unit 210 determines that an error occurred in the application execution unit 201 and does not send a timer reset command to the printer 3. As a result, the printer driver execution unit 210 can also determine if an error occurred, and on the printer 3 side the timer 409 count will reach the first reference time and an error will be reported.

As described above, the recording system according to this embodiment of the invention has a function that detects an error when the printer 3 does not receive a timer reset command from the host computer 2 within a certain period of time. The recording system according to this embodiment of the invention is configured so that a function of the application execution unit 201 running an application program on the host computer 2 connected to the printer 3 outputs a timer reset command at a specific period to the printer 3 and outputs a command to print data processed by an application program. When the application execution unit 201 outputs a timer reset command and when it outputs a print command, the printer driver execution unit 210 sends a timer reset command to the printer 3.

More specifically, in a recording system according to this embodiment of the invention, the host computer 2, which is communicably connected to a printer 3 that detects (determines) an error has occurred when the time in which a timer reset command is not received reaches a first reference time, has an application execution unit 201 and a printer driver execution unit 210. The application execution unit 201 runs an application program and outputs data processed by the application program as recording data, and the printer driver execution unit 210 sends a recording job to the printer 3 based on the recording data output by the application execution unit 201. When the application execution unit 201 does not output the timer reset command, the printer driver execution unit 210, instead of the application execution unit 201, checks the status of the application execution unit 201, and sends a timer reset command to the printer 3 as appropriate based on the detected status.

As a result, even when the application execution unit 201 cannot output a timer reset command for some accidental reason, such as a conflict between the timer reset command output timing and the output timing of the data for printing, a timer reset command is sent to the printer 3 by outputting print data. The printer 3 will therefore not detect an error when the host computer 2 can execute the application program, and the printer 3 can accurately detect if the operating status of the host computer 2 is normal or an error has occurred.

In addition, when the host computer 2 hangs while the application execution unit 201 is executing the application program due to a software problem, or the host computer 2 stops operating normally due to a problem with the communication line 10 connecting the host computer 2 and printer 3, or because the host computer 2 power supply was interrupted due to an operator error, for example, the printer 3 also can accurately detect an error and the user can immediately know that a host computer 2 error has occurred from the error detection report of the printer 3.

As a result, even when the host computer 2 is located remotely from the printer 3, the user of the printer 3 can immediately know when a host computer 2 error has occurred, and can quickly take action to restore the system. Because the host computer 2 will thus not detect an error when the host computer 2 is operating normally, wasted effort spent checking the operating status or resetting the host computer 2 can be prevented, and the recording system 1 can operate efficiently.

In addition, the printer driver execution unit 210 of the host computer 2 outputs a response request to the application execution unit 201 before the time that the application execution unit 201 does not output a timer reset command or print data reaches the first reference time, and sends a timer reset command to the printer 3 if the application execution unit 201 returns a response to the response request. As a result, an opportunity to send a timer reset command before the printer 3 detects an error is assured when the application execution unit 201 does not send a timer reset command due to some accidental event, and the printer 3 can be prevented from detecting an error. As a result, because the printer 3 detects an error only when an error that should be detected occurs on the host computer 2 side, such as when an application program hangs or host computer 2 operation stops, the printer 3 can accurately detect errors in the operating status of the host computer 2.

In addition, because a second reference time that is shorter than the first reference time is preset in the printer driver execution unit 210, and a response request is output to the application execution unit 201 when the time for which the application execution unit 201 does not output a timer reset command or print job reaches the second reference time, a response request can be reliably executed before the printer 3 detects an error.

This embodiment of the invention describes the printer driver execution unit 210 generating a print job based on a print instruction output by the application execution unit 201, but the invention is not so limited. For example, a configuration in which the application execution unit 201 generates and outputs print jobs, and the printer driver execution unit 210 sends the print jobs to the printer is also conceivable.

In the recording system 1 having one or a plurality of printers 3 connected to one host computer 2 according to the foregoing embodiment of the invention, the printer driver execution unit 210 of the host computer 2 monitors the time that the application execution unit 201 does not output a print command or timer reset command, but the invention is not so limited. For example, a configuration in which a plurality of host computers 2 and a plurality of printers 3 are communicably connected over a single network, and one host computer 2 monitors the time that the application execution unit 201 of another host computer 2 does not output a print command or timer reset command, is also conceivable. Further alternatively, a configuration in which a dedicated device that monitors the operation of the application execution unit 201 of each host computer 2 is connected to the host computer 2 is also conceivable.

The first reference time is also preset and stored in flash ROM 42, and the second reference time is preset and stored in the storage unit 24, in the foregoing embodiment, but the host computer 2 could communicate with the printer 3, acquire the first reference time stored in the printer 3, and automatically set a second reference time that is shorter than the acquired first reference time.

Yet further, in addition to causing an LED indicator 5 to light steady or blink, printing a message reporting that an error occurred, or audibly outputting an error message, the method whereby the printer 3 reports an error could involve the printer 3 sending a control signal to another device connected to the printer 3, and the device that receives this control signal displaying a message or otherwise reporting the error.

Because the printer driver execution unit 210 in these configurations generates and sends a timer reset command to the printer 3 at an appropriate time, the invention can be used with a variety of application programs 24B even if the application program 24B or application execution unit 201 is not compatible with the timer reset command.

The printer 3 is also described as an inkjet printer in the foregoing embodiment, but the recording devices to which the invention can be applied are not particularly limited insofar as the recording device can be any device that records markings such as text and images. More specifically, the invention can also be used with thermal printers that print to thermal roll paper using a line thermal head having heating elements, to dot impact printers, and laser printers. The invention can also be applied to printers incorporated in other devices.

The steps executed by the recording control unit described in the foregoing embodiment can also be performed as a computer-executable program. This program can also be stored on any type of non-transitory computer-readable recording medium such as a hard disk drive, an optical disc, a magneto-optical disc, USB drives, media cards, or flash memory, or any combination thereof.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording control device that is communicably connected to a recording device that receives a connection confirmation command and detects an error when a time during which the connection confirmation command is not received reaches a first reference time, the recording control device comprising:
   an application execution unit that executes an application program and outputs data processed by the application program as recording data; and a recording control unit that sends a recording job to the recording device based on the recording data output by the application execution unit;

wherein when the application execution unit does not output the connection confirmation command, the recording control unit checks a status of the application execution unit and based on the status generates and sends the connection confirmation command to the recording device; and wherein the recording control unit comprises a timer, outputs a response request to the application execution unit before a time during which the application execution unit does not output at least the connection confirmation command reaches the first reference time, and sends the connection confirmation command to the recording device if the application execution unit outputs a response to the response request.

2. The recording control device described in claim 1, wherein:

a second reference time that is shorter than the first reference time is preset in the recording control unit; and the recording control unit outputs a response request to the application execution unit when the time during which the application execution unit does not output at least the connection confirmation command reaches the second reference time.

3. The recording control device described in claim 1, wherein:

the recording control unit generates and sends the connection confirmation command to the recording device when the application execution unit outputs the recording data.

4. A recording system including a recording device that records on a recording medium, and a recording control device communicably connected to the recording device, wherein:

the recording device includes a reception unit that receives a connection confirmation command from the recording control device, and an error detection unit that detects an error when the time during which the connection confirmation command is not received by the reception unit reaches a preset first reference time;

the recording control device includes an application execution unit that executes an application program and outputs data processed by the application program as recording data, and a recording control unit that sends a recording job to the recording device based on the recording data; and when the application execution unit does not output the connection confirmation command, the recording control unit checks a status of the application execution unit and based on the status generates and sends the connection confirmation command to the recording device;

wherein the recording control unit comprises a timer, outputs a response request to the application execution unit before a time during which the application execution unit does not output at least the connection confirmation command reaches the first reference time, and sends the connection confirmation command to the recording device if the application execution unit outputs a response to the response request.

5. A recording control method is-executed by a recording control device that is communicably connected to a recording device that receives a connection confirmation command and detects an error when a time during which the connection confirmation command is not received reaches a first reference time, the recording control method comprising:

checking an operating status of an application program when the connection confirmation command is not output to the recording device when the application program executes, and based on the operating status, generating and sending the connection confirmation command to the recording device;

wherein the operating status of the application program is checked before a time during which at least the connection confirmation command is not output reaches the first reference time, and the connection confirmation command is generated and sent to the recording device based on the operating status.

6. The recording control method described in claim 5, wherein:

the connection confirmation command is generated and sent to the recording device when a recording job is sent based on recording data to the recording device.

7. A non-transitory computer-readable recording medium that stores a program executed by a recording control unit that is communicably connected to a recording device that receives a connection confirmation command and detects an error when a time during which the connection confirmation command is not received reaches a first reference time, the program comprising executing steps of:

checking an operating status of an application program when the connection confirmation command is not output to the recording device when the application program executes, and based on the operating status, generating and sending the connection confirmation command to the recording device;

wherein the operating status of the application program is checked before a time during which at least the connection confirmation command is not output reaches the first reference time, and the connection confirmation command is generated and sent to the recording device based on the operating status.

* * * * *